UNITED STATES PATENT OFFICE.

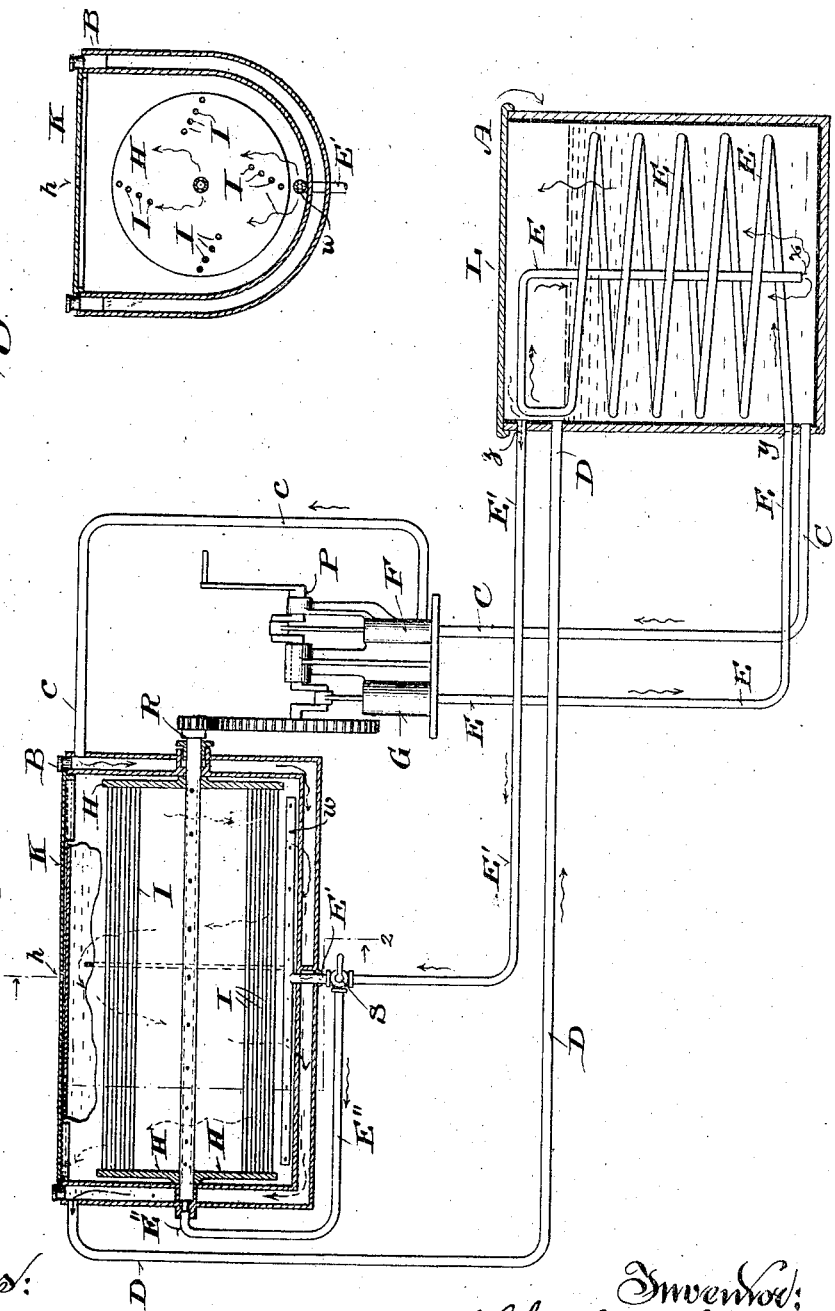

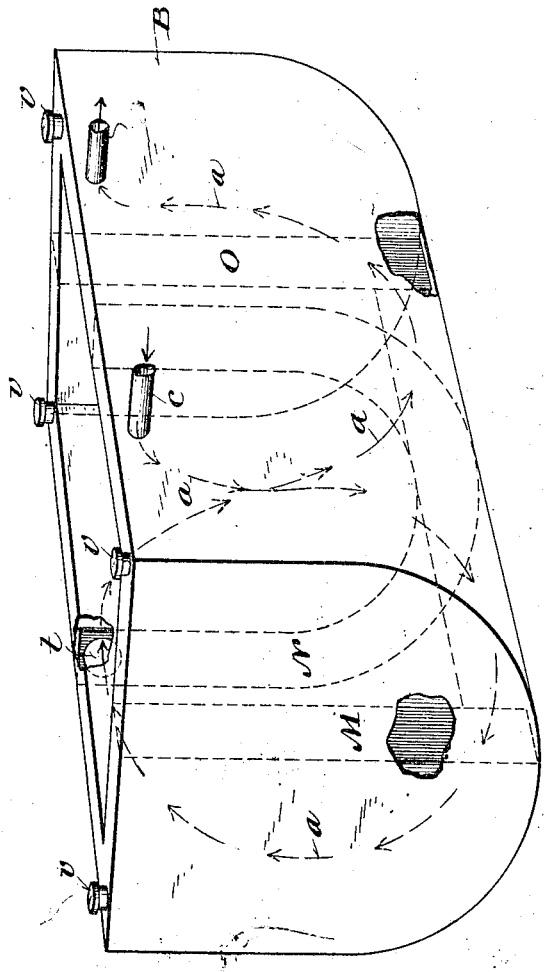

CHARLES H. SIEGMUND, OF MILWAUKEE, WISCONSIN.

CREAM-WHIPPING MACHINE.

No. 830,255.  Specification of Letters Patent.  Patented Sept. 4, 1906.

Application filed June 4, 1906. Serial No. 320,082.

*To all whom it may concern:*

Be it known that I, CHARLES H. SIEGMUND, a citizen of the United States, residing in Milwaukee, county of Milwaukee, State of Wisconsin, have invented a new and useful Improvement in Cream-Whipping Machines, of which the following is a specification.

The objects of my invention are to provide a machine in which cold air and cold water are employed in the whipping of the cream to facilitate and improve the process.

It consists in certain novel features of construction and in the peculiar arrangement and combination of parts, as hereinafter particularly described, and pointed out in the claims.

In the accompanying drawings like letters designate the same parts in the several figures.

Figure 1 is a cross-section of the entire machine, showing cream-hopper, ice and water box, and pumps and pipes for circulation of water and cold air. Fig. 2 is a cross-section of the cream-hopper along line 2 2. Fig. 3 is an enlarged view of the cream-hopper with certain parts broken away, showing partitions between double wall of hopper-jacket, the partitions being so disposed as to create currents, as per arrow-line, from water-supply pipe around hopper-jacket and out of drain-pipe.

A is a water-tight box designed for holding water and ice.

B is a hopper designed for holding cream, hopper being provided with double walls, (and certain partitions, hereinafter described,) between which water, reduced in temperature by means of ice and salt, circulates in the manner hereinafter described.

Hopper B is provided with reel H, which revolves inside of cream-space in hopper, said reel H being the means for whipping the cream placed in the hopper.

C is a pipe which supplies the hopper-jacket with cold water drawn from box or tank A in the manner hereinafter described by means of plunger-pump F.

D is a pipe which drains cold water from hopper-jacket after the water has circulated about chamber between double walls of hopper and carries the water back into box or tank A. (Pipe C and D can enter and leave hopper-jacket either at ends, as shown in Fig. 1, or at sides, as shown in Fig. 3, latter method being preferred.)

G is a double-action air-pump used for pumping air through pipe E into coil E in box or tank A. Pipe E enters coil E near bottom of box or tank A at $y$. Air is circulated upward by force exerted by air-pump G and then descends in straight termination of coil E and is emitted at point $x$. Then it rises upward or bubbles through the cold water in box or tank A and is carried out of box or tank A at $z$ into pipe E', air being reduced in temperature by virtue of its circulation through coil E (which is surrounded by cold water and ice, as described, salt to be added, if desired) and its rising or bubbling upward through the water.

E' is a pipe which carries cold air from box or tank A after air has been cooled, as described, and which is provided with stop-cock S. The stop-cock S divides pipe E' into two parts, one part passing through hopper-jacket into cream-chamber at the lowest point of cream-chamber and terminating in a straight pipe $w$, which runs the entire length of bottom of cream-chamber, this termination of pipe being provided with graduated holes by means of which the air is emitted into cream-chamber. The other part E'' continues (either outside of hopper-jacket or between the walls of hopper-jacket) and terminates at end of reel-shaft R, air being emitted at that point into hollow shaft R and is then emitted from hollow shaft R into cream-chamber by means of graduated holes in said shaft, smallest hole being nearest point at which E'' connects with R and largest hole being near opposite end of shaft. The object of these graduations in shaft R and pipe $w$ is to equalize emission of air into cream-chamber, stop-cock S being provided for the shutting off of air-current from pipe E''.

F is a plunger-pump which carries cold water from box or tank A through pipe C into the hopper-jacket, where it circulates in the manner described by the arrow-lines in Fig. 3 and then flows back into box A through pipe D. Box A is provided with a lid L, which renders box A air-tight.

Inside of hopper B in the cream-chamber is reel H, Figs. 1 and 2. This reel consists of two metal or wooden disks suspended on shaft R in the manner shown in Fig. 1. Between these disks are strung I-metal wires, said wires not being disposed radially, but at a slight angle, as shown in Fig. 2, wires being disposed in sets of four or more. Reel H is revolved by means of pulley or gear wheels connected with power-shaft P. Power-shaft P operates also plunger-pump F and air-pump G.

Cream-hopper is provided with a lid K, which securely closes same, lid K being provided with hole $h$, which permits the escape from the chamber of air pumped into the chamber in the manner described.

Jacket of hopper B is provided with double walls. Between the inside and outside walls are disposed partitions or baffle-walls M, N, and O, Fig. 3, M and O being disposed at the two ends of hopper-jacket, as shown in Fig. 3, and N at its middle. N is provided with hole $t$. These partitions or baffle-walls compel circulation of water, as described by arrow-lines $a$, namely: Water enters at C and is driven downward between the double wall of hopper to the opposite side of hopper between partitions or baffle-walls M and N. On the opposite side of the tank it rises and is allowed to flow into other half of hopper-jacket through hole $t$. Having passed through $t$, water descends and rises, being confined by walls N and O, and is emitted at D. Constant circulation is provided in this manner.

Hopper-jacket is provided with four small caps disposed at four corners of hopper, which cover holes in hopper-jacket or water-chamber, through which salt and ice chips can be put into water-space through hopper-jacket, if desired, to hasten process of temperature reduction.

The operation of the machine is substantially as follows: When crank at end of power-shaft is turned or power is applied to the shaft, the reel in cream-chamber of hopper revolves and the air-pump G and the water-pump F operate, action of the three parts being simultaneous. Water-pump F pumps water, reduced in temperature by virtue of the ice (or salt, if desired) mixed with it, from box A through pipe C into hopper-jacket. Water circulates in hopper-jacket around cream-chamber by means of the force applied to it by the pump and flows back into box A through pipe D, thus causing constant circulation of water while power is being applied. Air-pump G pumps air into coil E. Air passing through coil E is cooled by means of the contact of coil with ice and water in box A, is emitted at X, (being still further cooled by bubbling through the ice water in box A,) and is carried by means of pipe E' into the cream-chamber in hopper. Here by virtue of the whipping of the cream caused by the revolution of the reel the air is mixed with the cream. The process is the reduction of the temperature of the cream which is being whipped by means of the injection of the cold air into the cream and the circulation of the cold water around the cream.

I claim and desire to secure by Letters Patent—

1. In a machine for whipping cream the combination of a hopper for holding the cream, provided with a reel for whipping the cream and double walls (constituting water-chamber about cream-chamber) and baffle-walls for compelling circulation of cold water about water-chamber, and air-pipes for carrying air into the cream-chamber, and an air-tight box or tank in which air and water are cooled by means of ice and salt, together with air and water pumps for causing circulation of air and water reduced in temperature in the ice-box, substantially as described.

2. In a cream-whipping machine the combination, on a common power-shaft, of a reel for whipping cream, a water-pump provided with a system of pipes for pumping water into a water or cooling chamber around cream-chamber and an air-pump provided with a system of pipes for injecting cold air into the cream-chamber, substantially as described.

In witness whereof I have signed my name to this specification, in the presence of two subscribing witnesses, this 31st day of May, A. D. 1906.

CHARLES H. SIEGMUND.

Witnesses:
JOHN SCHLEHLEIN, Jr.,
EDWARD D. JENNER